No. 648,049. Patented Apr. 24, 1900.
J. B. NICHOLLS.
DRESS AND MUD GUARD.
(Application filed Aug. 12, 1899.)
(No Model.)
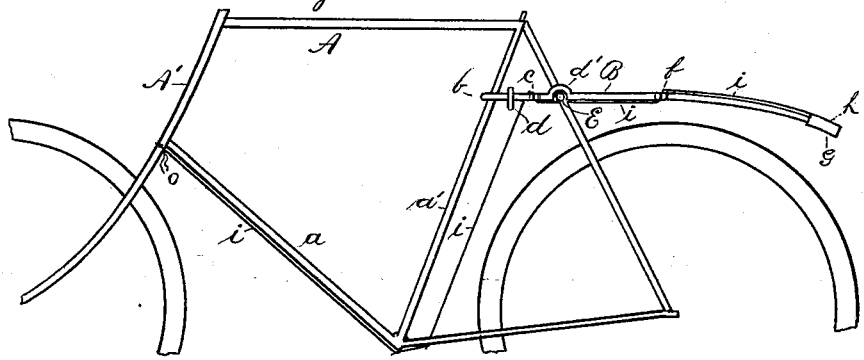
Fig. 1.
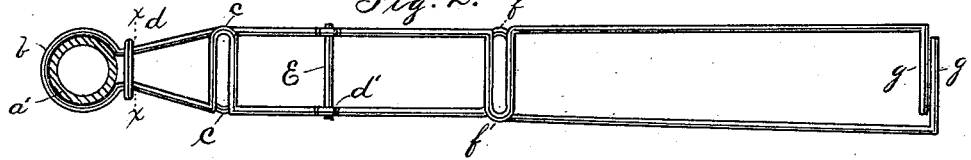
Fig. 2.
Fig. 3.
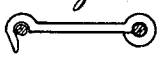
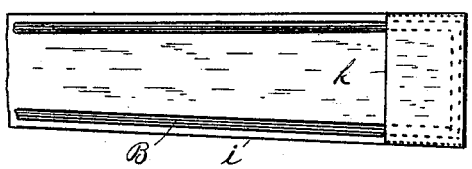
Fig. 4.
Fig. 5.
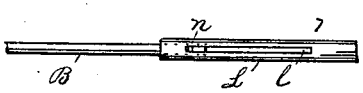
Fig. 6.
WITNESSES:
H. A. Daniels
Charles P. Swett
INVENTOR
John B. Nicholls.
BY
Chas. C. Swett
ATTORNEY

UNITED STATES PATENT OFFICE.

JOHN B. NICHOLLS, OF WASHINGTON, DISTRICT OF COLUMBIA.

DRESS AND MUD GUARD.

SPECIFICATION forming part of Letters Patent No. 648,049, dated April 24, 1900.

Application filed August 12, 1899. Serial No. 726,987. (No model.)

*To all whom it may concern:*

Be it known that I, JOHN B. NICHOLLS, a citizen of the United States, residing at Washington, in the District of Columbia, have invented certain new and useful Improvements in Dress and Mud Guards; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to guards attachable to vehicles for protecting the vehicle and the rider from mud thrown from the revolving wheels. It is shown in this application as adapted for use on a bicycle.

The device is very simple, is manufactured at small cost, and is easily attached to or detached from the vehicle without tools.

The accompanying drawings illustrate the invention, in which—

Figure 1 is a side elevation of portions of a bicycle with the device attached thereto. Fig. 2 is an enlarged plan of the guard-frame. Fig. 3 is a vertical section taken on line $x\ x$ of Fig. 2. Fig. 4 is a section of the ferrule with the ends of the frame therein. Fig. 5 is a plan of the under side of the rear end of the guard, and Fig. 6 shows a portion of the guard-reach with a modification.

Like letters denote corresponding parts in the several views.

The letter A indicates the body and parts of a bicycle with my invention in operative position. A is the front side, $a$ is the lower side, and $a'$ is the rear side, of the body.

B denotes the guard-frame. It is preferably made of a single piece of wire, whose middle portion is curved to form a clamp $b$ to fit upon and partly surround the rear side $a'$ of the bicycle-body. A catch $d$ secures the frame thereon. From the clamp $b$ the frame extends rearwardly and divergingly a short distance and is bent to form two transverse loops $c\ c$, and contiguous thereto arches $d\ d$ to engage the cross-bar E between the rear forks and above the rear wheel. Still farther toward the rear of the guard-frame two other loops $f\ f$, similar to those marked $c\ c$, are formed, and the extreme rear ends of the frame $g\ g$ are bent inwardly at a right angle and preferably inserted in a ferrule G or some equivalent fastening. A strip of rubber, oil-cloth, or other suitable material $i$ is provided with a shallow terminal recess $k$ to receive the frame ends $g\ g$, and is made long enough to extend, and is extended, from the rear end of the frame along its upper side down through the loops $f\ f$, forward under the cross-bar E, up through the loops $c\ c$, then down around the treadle-axle, and forward beneath the side $a$ to the side $A'$ of the bicycle-body, where it is secured, preferably by tying with a cord $o$. The reaches of the frame may be provided with the telescoping device shown in Fig. 6, in which the wire is adapted to enter a slotted sleeve L, forming a part of the frame, and is provided with a retaining-pin $n$, moving in the slot $l$. By these means the frame is shortened in a measure for convenience in carrying.

To attach the device, lift the catch $d$, spread the frame laterally, pass it about the side $a'$ of the body and between the rear forks above the cross-bar E of the bicycle, and rest the arches $d'\ d'$ thereon. If a ferrule is used, place it on the rear ends of the frame. Lock the clamp with the catch $d$ and slip the rear end of the frame into the recess $k$ of the cover $i$, which is applied and fastened on, as already described.

To detach the guard, reverse the operation by removing the cover and then the frame. The device is easily carried when bound to the upper side of the bicycle-body.

What I claim and desire to secure is—

1. A mud-guard frame formed of a wire having its middle portion curved to form a clamp, adapted to fit on a bicycle-body, a catch to fasten the clamp thereon, arches to engage the cross-bar between the rear forks of the bicycle, transverse loops to receive and hold the guard-cover and means for holding the rear ends of the frame together, substantially as described.

2. A mud-guard frame formed of a wire having its middle portion curved to form a clamp adapted to fit a bicycle-frame, a catch to fasten the clamp thereon, arches to engage the cross-bar between the rear forks of the bicycle, transverse loops to receive and hold the guard-cover, a guard-cover having a rear recess adapted to hold the rear ends of the frame and of a suitable width and length to be extended along the said frame and between the bicycle wheels and frame, as herein set forth.

3. In a wire mud-guard frame a curved clamp fitted to the bicycle-frame, arches to engage the cross-bar between the rear forks of the bicycle, telescoping devices on the frame-reaches and transverse loops to receive and hold the guard-cover, substantially as herein set forth.

In testimony whereof I affix my signature in presence of two witnesses.

JOHN B. NICHOLLS.

Witnesses:
H. A. DANIELS,
J. J. NELLIGAN.